(12) United States Patent
Hastings

(10) Patent No.: US 6,751,596 B1
(45) Date of Patent: Jun. 15, 2004

(54) SYSTEM AND METHOD FOR TRACKING, MONITORING, AND SUPPORTING SELF-PROCURING PRINCIPALS IN REAL ESTATE TRANSACTIONS

(75) Inventor: Brian Hastings, Pomona, CA (US)

(73) Assignee: Patriot Real Estate System, LLC, San Dimas, CA (US)

( * ) Notice: Subject to any disclaimer, the term of this patent is extended or adjusted under 35 U.S.C. 154(b) by 0 days.

(21) Appl. No.: 09/296,709

(22) Filed: Apr. 20, 1999

(51) Int. Cl.[7] .............................................. G06F 17/60
(52) U.S. Cl. .............................. 705/10; 705/37; 705/38
(58) Field of Search ................................. 705/10, 1, 35, 705/37, 38, 44

(56) References Cited

U.S. PATENT DOCUMENTS

| | | | | |
|---|---|---|---|---|
| 4,870,576 A | * | 9/1989 | Tornetta | 364/401 |
| 5,276,866 A | * | 1/1994 | Paolini | 395/600 |
| 5,664,115 A | * | 9/1997 | Fraser | 705/37 |
| 5,754,850 A | * | 5/1998 | Janssen | 395/615 |
| 5,867,155 A | * | 2/1999 | Williams | 345/327 |
| 5,974,406 A | * | 10/1999 | Bisdikian et al. | 707/1 |
| 6,321,202 B1 | * | 11/2001 | Raveis, Jr. | 705/1 |

FOREIGN PATENT DOCUMENTS

WO    WO 200241115 A2 *  5/2002    ........... G06F/17/60

OTHER PUBLICATIONS

Scott, Match clients and properties with Real Estate Organizer, Nov. 1996, Computer Shopper, vol. 16 No. 11, p. 543.*
Online Real Estate Service Debuts, Jan. 1996, Multimedia Networking Newsletter, vol. 3 No. 12.*
UK's First Fully Searchable Internet Property Service, Jun. 1995, M2 Presswire.*
More Than One Million Listings Put HomeShark On Top; Combined Listings and Mortgage Resources Make Home-Shark the Leader in Online Residential Real Estate, Jul. 1998, Business Wire.*
Real estate organizations, Jul. 1998, Austin American Statesman.*
Hastings, B., *The Homestead Program*, Revision Guide, Oct. 3, 1996, 61 pgs.
Woods, M., *The Official Training Manual for The Nehemiah Down Payment Assistance Program*, The Nehemiah Program Manual, 11/97, 24 pgs.
Geac Computer Corporation Ltd., Geac Altaira™, Version 3.2, Web Page Printout, Apr. 14, 1999, 2 pgs.
IRIS, LLC, *IRIS/Immediate Results through Intuitive Systems, LLC*, Web Page Printout, Apr. 14, 1999, 1 pg.

* cited by examiner

*Primary Examiner*—Joseph Thomas
*Assistant Examiner*—Christopher L. Gilligan
(74) *Attorney, Agent, or Firm*—Christie, Parker & Hale, LLP

(57) ABSTRACT

A system and method for tracking, monitoring, and supporting self-procurement of an individual for the purchase of a home. As a self-procuring principal (SPP), the individual would be entitled to the real estate commission payable to licensed real estate agents. To aid the SPP in his self-procurement activities, the system provides information to the SPP of property listings that match the SRP's search criteria. The system also provides comparable sales information of other homes in the area, school district reports, environmental hazard reports, and automated offer drafting assistance. If the SPP wants to view a property, the system coordinates such viewing by contacting chaperones to provide the showing of the property. The SPP's self-procuring activities are tracked by the system for inclusion in the SPP's loan file. The report certifies that the SPP has indeed represented and procured himself, and thus, is entitled to the real estate commission. The SPP can then apply the commission towards the downpayment of a home.

14 Claims, 13 Drawing Sheets

SELF-REPRESENTING PRINCIPAL (SRP)
ACTIVITY SUMMARY

Principal: John Doe
1111 Main Street
Alta Loma, CA 91701

Client ID No: 001111111
Report Date: 03/16/1999

1st Contact: 10/27/98    HUD School Date: 01/03/99    Brokerage Orient: 01/10/98

FILTER PROFILE:  Beds: 2+   Baths: 1.50+   SQ FT: 800+   Age: 1970+
Price: $75,000 - $90,000   Pool: Maybe   Spa: Maybe
Fireplace: Maybe   Garage: 1+   Type: Condo/PUD
City(ies): Rancho Cucamonga   Thomas Filter: None

NOTIFICATION HISTORY

| NOTIFICATION DATE | MLS NO SQ FT | BEDS | BATHS | STREET ADDRESS TGUIDE | LISTED | OFF MARKET | LIST PRICE |
|---|---|---|---|---|---|---|---|
| 01/22/99 | I824017 832 | 2 | 2.00 | 1111 State St., Rancho Cucamonga 57387 | 08/11/98 | 01/12/99 | $85,000 |
| 01/22/99 | I824497 1,001 | 2 | 2.00 | 8888 Palm St., Rancho Cucamonga 603A2 | 08/17/98 | 02/04/99 | $79,995 |
| 01/25/99 | C809396 1,050 | 2 | 2.00 | 5555 Sunset St., Rancho Cucamonga 603A2 | 08/20/98 | 01/11/99 | $82,000 |

ACTIVITY HISTORY

| ACTIVITY DATE | PROPERTY ADDRESS |
|---|---|
| 01/26/99 | 1111 State St, Rancho Cucamonga |
| | SRP viewed interior. Floorplan unsatisfactory. |
| 01/28/99 | 8888 Palm St, Rancho Cucamonga |
| | SRP viewed property and is interested. Requested comparable sales report to compose offer. Comparable sales sent on 01/16/99 |
| 02/07/99 | 8888 Palm St, Rancho Cucamonga |
| | SRP requested an offer to be drafted at $83,000. Offer submitted to listing office. |

FIG. 2A

| | |
|---|---|
| 02/11/99 | 8888 Palm St, Rancho Cucamonga |
| | Counter-offer received at $89,500. Seller countered title and escrow. SRP advised. |
| 02/11/99 | 8888 Palm St, Rancho Cucamonga |
| | SRP advised to counter back at $87,000. Countered title and escrow services. |
| 02/17/99 | 8888 Palm St, Rancho Cucamonga |
| | Counter-offer received at $89,500. Seller countered title and escrow again. SRP advised. |
| 02/18/99 | 8888 Palm St, Rancho Cucamonga |
| | SRP advised office to accept the counter, as she indicated that this property suits her needs best at this price level. |

CLOSING PHASE

Property: 8888 Palm St, Rancho Cucamonga

| | |
|---|---|
| 02/19/99 | Listing office selected and opened escrow.<br>ABC Escrow/Tina-Escrow Officer; File No 1212. |
| 02/24/99 | SRP read and approved hazards disclosure<br>Property J.D. #PID11111111 |
| 02/25/99 | SRP deposit of $500 placed in escrow |
| 02/26/99 | Physical inspection performed. SRP requested corrections to be completed prior to close of escrow. |
| 03/05/99 | SRP returned signed escrow instructions and title company statement of information |
| 03/05/99 | SRP read and approved preliminary title report |
| 03/05/99 | SRP received Buyer's Warranty<br>including air conditioning coverage.<br>Policy # 007280811 |
| Pending | SRP read and approved CC&Rs, HOA bylaws |
| Pending | SRP read and approved termite inspection |
| Pending | SRP performed walk-through and accepted property condition.<br>Closing authorized by SRP. |

FIG. 2B

Client ID: 001186001

573D5 013|

1111 Main St., Ranch Cucamonga 91701

$164,9000

[Image]

Features*
attached home
4/3.00 1,717
two story
two car detach
no pool no spa
central air
3,920 foot lot
fireplace
built in 1988
family room

| Home | 09901334 |

Payment* 7.00% - 7.79 APR
| loan | $1,057 |
| taxes | $172 |
| fire ins | $46 |
| mtg ins | $65 |
| hoa dues | $0 |
| total pymt | $1,339 |

| Listed | 1/14/99 |

Cash Required*
Estimated Closing*
| asking price | $164,900 |
| pre-paids | $1,911 |
| closing costs | $3,500 |
| total cash move-in cost | $170,382 |
| loan amount* | $156,101 | seller may pay buyer's closing costs  $5,482
cash down payment required  $8,799

Down Payment Assistance  $4,947
Funds needed to close escrow...  $3,852

Comments BANK REPO SALE!! MAKE OFFER!! AREA'S BEST BUY!! LOT'S OF TILE WORK AND BRICK WORK. NEEDS A LITTLE TLC NOT MUCH, SOLD "AS IS" CONDITION. LOCATED AT END OF CUL-DE-SAC NICE QUIET ARE, 4TH BEDROOM IS DOWN STAIRS COULD BE DEN CHECK IT OUT, WON'T LAST.

---

573E6 014|

1111 State St., Ranch Cucamonga 91739

$165,900

[Image]

Features*
attached home
4/2.00 1,545
two story
two car attach
no pool no spa
central air
3,500 foot lot
fireplace
built in 1989
no family room

| Home | 09835271 |

Payment* 7.00% - 7.79 APR
| loan | $1,057 |
| taxes | $172 |
| fire ins | $46 |
| mtg ins | $65 |
| hoa dues | $0 |
| total pymt | $1,339 |

| Listed | 12/7/98 |

Cash Required*
Estimated Closing*
| asking price | $165,000 |
| pre-paids | $1,912 |
| closing costs | $3,570 |
| total cash move-in cost | $170,482 |
| loan amount* | $156,101 | seller may pay buyer's closing costs  $5,482
cash down payment required  $8,899

Down Payment Assistance  $4,950
Funds needed to close escrow...  $3,949

Comments THANK YOU

FIG. 7

SYSTEM AND METHOD FOR TRACKING, MONITORING, AND SUPPORTING SELF-PROCURING PRINCIPALS IN REAL ESTATE TRANSACTIONS

FIELD OF THE INVENTION

The present invention relates generally to computer implemented systems for facilitating real estate activities, and more particularly, to a system and method for tracking, monitoring, and supporting individuals to represent themselves towards the purchase of a real estate property.

BACKGROUND OF THE INVENTION

In 1995 the United States Government adopted a National Homeownership Strategy (the "Strategy") with a primary goal to propel the rate of homeownership to an all-time high by the end of the year 2000. The Strategy is described as "a call to action, not an academic exercise." In the following quotation, the Strategy cited a major barrier that would have to be overcome to realize this goal: "For many potential homebuyers the lack of cash available to accumulate the required down payment and closing costs is the major impediment to purchasing a home." The Strategy further suggested that the real estate and lending industries needed to focus on three issues to overcome this barrier: 1) cut transaction costs; 2) reduce down payment and mortgage costs; and 3) increase availability of financing. In addition, a key element of the financing strategy was to pass on savings to consumers created through reengineering both the mortgage and real estate sales process.

The traditional path to homeownership requires the buyer to provide a down payment of approximately four to five times their normal monthly housing cost as a test of their homeownership commitment. This requirement can be difficult to meet for many homebuyers. Saving five or six thousand dollars often requires people to take on a part time job for as long as a year or more, especially when taxes, child care and transportation costs are considered. This means a potential homebuyer may need to spend an additional 400 to 700 hours away from their families while working to accumulate the necessary funds for a downpayment. This time commitment can be very disruptive to normal family life. Testing the buyer's resolve to achieve homeownership in a manner that alienates them from their families is not in the interests of government or the consumer. Also, this process can be especially burdensome for single parent households.

The government has responded to this need with limited down payment assistance programs for first-time and low-income homebuyers. These programs have allowed many to attain homeownership, but it has brought frustration to even more people due to the limited funding availability. Stringent qualifications restrict disbursing funds to only the most needy of applicants. As budget cutbacks are threatened, the prospect of government subsidized programs as a consistent source of down payment assistance looks bleak. While the simplest solution may be to remove the down payment requirement altogether, this would require an act of Congress. The National Housing Act mandates a three percent cash investment from homebuyers using the FHA loan program offered through HUD, the Department of Housing and Urban Development.

Currently, other methods of measuring the buyer's cash contribution into the transaction have been allowed by HUD. One well-known program, Habitat for Humanity, promoted by former President Jimmy Carter, allows lower-income homebuyers to contribute construction labor in what can be described as an old style "barn-raising" cooperative. This type of cash investment, known as "sweat equity", entered the FHA loan underwriting handbook in December of 1988.

While the Habitat for Humanity program has literally put thousands of people in their own homes across the country, it falls short of being considered a major solution. Because buyers are required to perform labor on the basic structural components of the home, such as framing, roofing, electrical, plumbing, etc., the program requires professional construction supervision to ensure that the participant's efforts meet industry standards. In addition, in the resale market where over 80 percent of the transactions take place, the opportunity for the buyer to provide construction labor as the cash investment does not exist. Also, a physically impaired homebuyer would have difficulty participating. This encourages regulators to seek out a program design that reflects better compliance with the Americans with Disabilities Act, as well as one that is available on more homes to provide better selection.

Chapter 7 of The National Homeownership Strategy introduced homebuyer counseling as a new concept into the discussion of mortgage default prevention. Homebuyer counseling was cited as a practice that effectively reduces the risk of mortgage default. In order to promote its use, the Strategy recommended that pre-purchase counseling become an integral part of the homebuying process, that a predictable stream of funding sources be created for counseling, and that brokers, lenders and counseling providers pool their resources to expand homebuyer education.

Thus, HUD announced an initiative offering to reduce the charge it makes for FHA mortgage insurance by a quarter percent for buyers who participate in a HUD sponsored housing counseling program. The incentive was doubled one year later through Mortgagee Letter 97-37. HUD stated that it believed education made first-time homebuyers better homeowners and borrowers, and that such homebuyers represented a lower risk to the insurance fund. Therefore, the reduction in the amount of the up-front premium collected from these homebuyers was justifiable.

HUD also called upon the real estate and lending industries to market the initiative and even developed a special homebuyer training course called the Homebuyer Education and Learning Program (HELP). In order to promote its use, HUD allows homebuyers to obtain training even after they have become committed to a purchase contract. While it may seem that placing someone through homebuyer training after they contract to buy a home is putting the cart before the horse, HUD has little choice in the matter. HUD cannot force their training into the marketplace, but must work in cooperation with the real estate industry. Since the industry is dominated by a sales force that derives its income from commissions, it may be unrealistic to expect them to turn over control of their client to a government sponsored instructor.

Thus, use of true pre-purchase counseling is all but non-existent in the marketplace. What is actually being performed in order to obtain the FHA mortgage insurance premium discounts is pre-closing counseling. The difference is simple, yet important. Homebuyers are currently being sent to an abbreviated class after they have been obligated in a purchase contract and rarely before. This is in spite of the fact that true pre-purchase counseling was originally declared by HUD as being the preferred format. Mortgagee Letter 98-01 released in January of 1998 reprimanded the industry for allowing grossly inadequate homebuyer counseling in exchange for the mortgage insurance reduction. HUD warned that training must be provided in a classroom, face to face or electronic media format, and involve 15 to 20 hours of instruction to claim the premium discount. It is argued that the industry does not embrace pre-purchase counseling as it tends to undermine their control of the prospective homebuyer. By waiting until the client is obligated in an agreement to purchase a home, real estate agents prevent the possibility of losing a client as a result of information provided to them in homebuyer counseling sessions. Typically, only after purchasing a home is the buyer referred to a counseling program to claim the FHA insurance discount. While this defeats the purpose of educating them, it may well be that pre-closing as opposed to actual pre-purchase counseling is the best voluntary level of compliance HUD can get from the present real estate industry.

HUD's difficulty in enforcing greater compliance with their pre-purchase educational curriculum stems from their policy of financing the mortgage insurance premium. Giving a discount on the up-front mortgage insurance premium does not reduce the buyer's cash investment requirement, it only reduces their monthly payment by approximately $5. The nominal motivation of $5 is not sufficient to compel homebuyers to attend HUD's full 15 hour classroom training. In fact, the incentive is so negligible that acquiring the discount becomes little more than an afterthought. A more compelling reward needs to be offered to entice homebuyers to attend these classes.

One response that resulted from the National Home Ownership Strategy's call to action, was from non-profit organizations that generate down payment assistance through a fee paid by sellers. One such program is known as the Nehemiah Program, operated by Nehemiah 2000 Homeownership Inc. (Nehemiah) . Nehemiah imposes a four percent fee on the seller if the seller's buyer is to receive a three percent down payment gift from the program. The trouble with such a design is that transaction costs increase instead of decrease. Buyers are told, that due to the large fee being paid by the seller, it is likely that they will have to pay the seller's full asking price or possibly even more. It is apparent that the non-profit programs are really just providing 100% financing through inflated sales prices, which mitigates the value of such home buying designs. In addition, while such organizations are required to only dispense funds to those that have attended homebuyer counseling, the programs still accept training that occurs after a contract is entered.

Accordingly, public demand exists for a new format in real estate brokerage. Examining the results of the Gallup Poll's annual Honesty and Ethics survey can best prove this. Since entering the poll in 1977, real estate agents have not been able to attain greater than a 17% public confidence rating for possessing high or very high ethics. This compares to the 50%+ratings received by doctors, dentists, engineers and the clergy. By re-engineering the real estate sales process, sufficient funds can be generated to fuel downpayment assistance programs that can entice homebuyers to attend HUD training courses prior to purchasing a home.

SUMMARY OF THE INVENTION

One solution to the problems of inconsistent down payment assistance funding and under-utilized pre-purchase homebuyer counseling is the utilization of a "Self-Representing Principal" (SRP) format. This solution was invented by the Applicant herein, and approved by the U.S. Department of Housing and Urban Development for use with its FHA loan programs on May 13, 1998. The SRP format is rooted in HUD underwriting regulations that came into effect in Revision 4 of the 4155.1 HUD Credit Underwriting Handbook in June of 1992 as Section 2-10 (P). This regulation reads as follows:

Commission from Sale. If the borrower is entitled to a real estate commission from the sale of the property being purchased, that amount may be used for the cash investment with no adjustment to the maximum mortgage required. A family member entitled to the commission may also gift those funds to the homebuyer.

Many, including HUD, have assumed over the years that this regulation was provided for licensed real estate agents purchasing their own homes. This assumption was not true. The federal government defers to the state with regard to licensing requirements for real estate activities. The applicant herein has been unable to identify any state that prohibits unlicensed principal self-representation in real estate transactions. In fact, the California Department of Real Estate issued a letter indicating that principals do not have to be licensed to earn a commission while purchasing their own home. HUD acknowledged this fact when it issued approval of the SRP procedure. Multiple Listing Service rules typically specify that the commission is earned through the act of procuring or finding the buyer. In the SRP format, the buyers procure themselves, thereby earning the commission. It is possible for someone to represent himself or herself in a home purchase transaction without a license, but he or she cannot represent someone else.

A self-representing principal (SRP) is a non-real estate licensed individual that seeks to purchase a property for his or her own account under buyer-broker agreement through a Multiple Listing Service member-broker. The SRP obtains property availability information through the broker's information system and support services. The brokerage agreement provides that the SRP will be entitled to a pre-negotiated share of the commission paid to the brokerage office that is earned through the SRP's purchase of a home. The SRP may also be referred as a SPP, self-procuring principal, or a SDP, a self-directing principal.

Section 2-10(p) of HUD's credit underwriting regulations allows the SRP format to provide down payment assistance through market efficiencies instead of government funding. In addition, it maintains compliance with the National Housing Act's three percent cash investment requirement. The SRP format further allows those who are physically impaired and unable to take advantage of sweat equity programs, to reap the rewards of their homeownership dedication by obtaining downpayment assistance on the basis of their educational efforts.

Giving homebuyers the ability to use the commission as their downpayment results in a homebuying process that is more useful to all Americans. It allows them to access the money they need to buy their home by becoming educated about the homebuying process directly from HUD and before they have entered into a purchase agreement. The SRP format contributes to achieving HUD's goals by providing a consistent non-government source of down payment assistance that HUD controls through their homebuyer education requirements. Since HUD's approval of this program requires the buyer's participation in pre-purchase, not pre-closing, counseling, HUD is assured of their opportunity to present the government's information prior to the buyer entering a contract.

The SRP format gives buyers ample reason to attend a full-length HELP training course, as they are then capable of accessing thousands of dollars in commissions for use toward their down payment. In most cases, the entire down payment requirement can be met through the earned commission. The value in this design is its ability to create a homeowner of someone who otherwise would not be. Thus, the SRP format provides HUD with the carrot it needs to attract homebuyers to the HELP classes. The mass utilization of homebuyer education was a goal embodied in the National Homeownership Strategy and one which the SRP format should achieve.

As a bonus for someone using the SRP format, commission funds acquired in this manner are not considered taxable, but rather a reduction to the tax basis of the home. This is advantageous to the homebuyer in light of the new capital gains exemption of up to $500,000 on a personal home. The lack of taxability on the SRP's commission stems from the fact that the homebuyer performs representation services for himself and the value of services one performs for oneself is not considered income.

The SRP format is therefore an alternative format to traditional brokerage practice. It employs the principles of the National Home Ownership Strategy to achieve the goal of expanding the availability of downpayment assistance. The SRP option puts homebuyers in control of the purchasing process and allows them to reap financial rewards which would be unavailable otherwise. By making homebuyers an integral part of this process, they are likely to be more deliberate in selecting their homes. This should result in greater homeownership satisfaction and decrease the possibility of default to the insurance fund.

Accordingly, the present invention comprises a computer system that tracks, monitors, and supports self-representation of a user in a real estate transaction. According to currently established requirements, the homebuyer using the system will have completed an educational program qualifying him or her for self-representation, and thus, at least a portion of real estate commissions for use towards downpayment of a home.

The system has access to a client database and a real estate property listings database. The listings database includes listings of property with property profile data. The tracking, monitoring, and supporting of the user comprises entering user profile data into the client database, the data including real estate property search parameters. The listings database is searched for a property profile matching the user profile. The matched property profile is retrieved from the listings database, and the user notified of the matched property. The property profile data might be transmitted in conjunction with the notification. Otherwise, the profile information is transmitted after the notification has been sent.

In one aspect of the invention, the system also tracks user self-representation activities relating to a matched property.

In another aspect of the invention, the system provides school district reports, or environmental hazard reports of a district where the matched property is located. The system further provides comparable sales reports or offer assistance reports of the matched property.

In yet another aspect of the invention, the system also coordinates the viewings of the matched property.

In still another aspect of the invention, the system creates a demand feature profile having property features from a plurality of user search parameters in the client database, and searches on assessor's property database for a property matching the demand feature profile. The assessor's property database includes profiles of properties that have not been placed for sale. The system further informs an owner of the matched property of market demand for the property.

BRIEF DESCRIPTION OF THE DRAWINGS

These and other features, aspects and advantages of the present invention will be more fully understood when considered with respect to the following detailed description, appended claims and accompanying drawings wherein:

FIGS. 2A–2B are illustrations of an exemplary activity tracking report generated by the system of FIG. 1;

FIG. 7 is an exemplary property availability report generated by the system of FIG. 1;

DETAILED DESCRIPTION OF THE INVENTION

Figure 1:
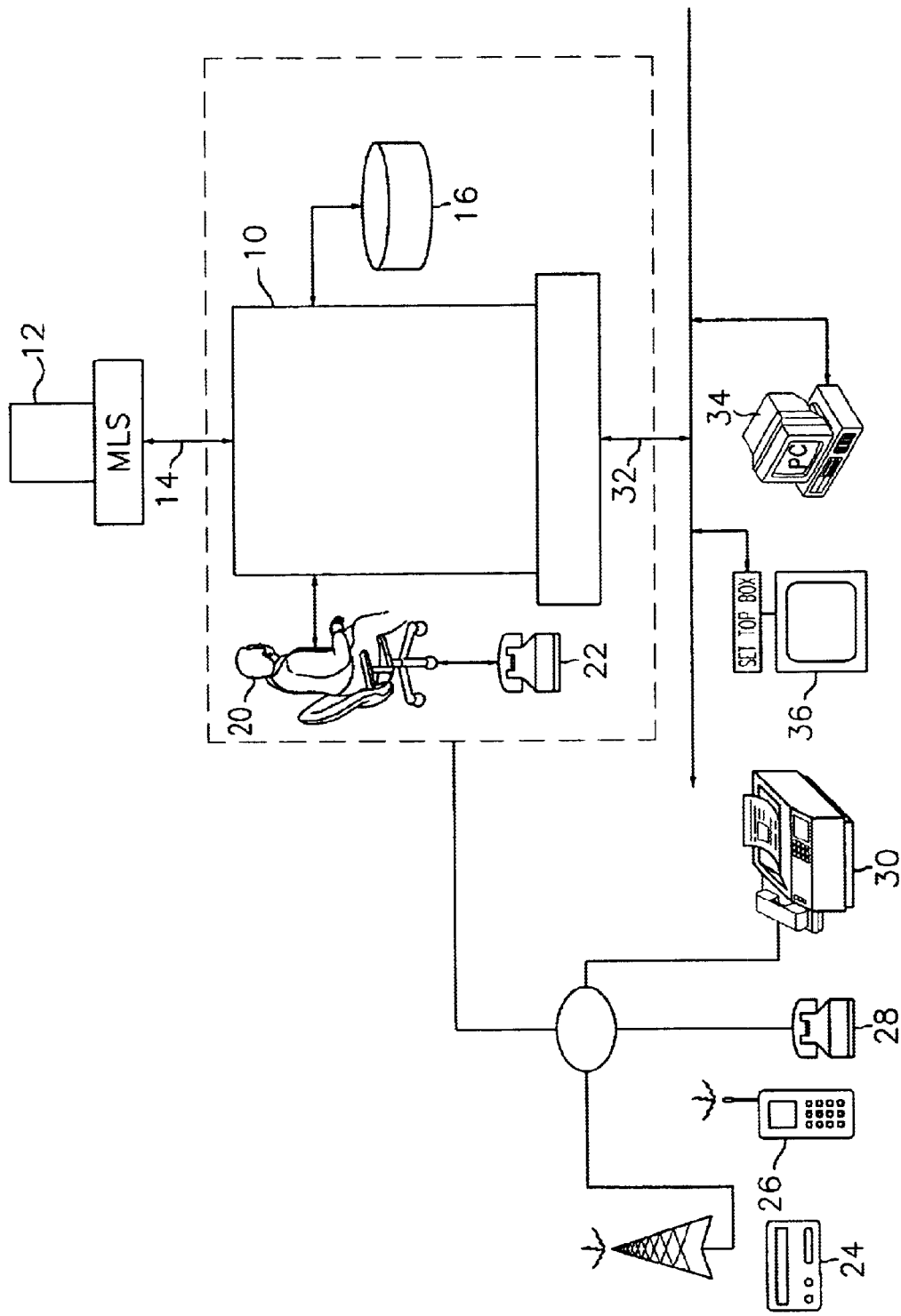
FIG. 1 is an exemplary semi-schematic block diagram of a system for tracking, monitoring, and supporting a self-representing principal in accordance with the present invention.

In general terms, the present invention is directed to a particular system and method for tracking, monitoring, and supporting self-representation of an individual in real estate related activities. Generally, such activities will relate to endeavors towards the purchase of a home. However, one skilled in the art should recognize that the activities might also relate to the purchase or leasing of real estate properties in general.

According to a currently preferred embodiment, an individual who becomes qualified for self-representation may act as his or her own real estate agent. As a self-representing principal (SRP), the individual would be entitled to all, or at least a portion, of the commission otherwise payable to a licensed agent representing the individual. The SRP would then use the real estate commission towards the downpayment of a property.

The current requirements developed by the applicant herein which were submitted to and approved by HUD on May 13, 1998, establish the procedure for an individual to be qualified as an SRP are as follows:

a) the buyer has a certificate evidencing his or her training in a consumer-oriented home purchase educational program;

b) the purchase agreement is entered into after the training certificate is issued, the purchase contract reflecting the buyer's entitlement to the commission;

c) the buyer has a documented ability to access property information systems and obtain broker support services in the same manner as a conventional agent;

d) the commission payable to the buyer in the purchase agreement is identical to that which was offered to the brokerage industry, as reflected in a Multiple Listing Service, a copy of which should be included in the loan file;

e) the buyer does not have a contrived arrangement for payment of commission, but rather a systematic approach to earning a commission through homebuyer education and performance of typical representation duties utilizing brokerage office support, in the same manner as a licensed agent; and f) an evaluation is done and a determination made that the commission was not a gift from the listing agent as described in 4155.1 2-10C, 3rd paragraph of the HUD Credit Underwriting Handbook. (This element was added by HUD as a requirement for insuring FHA loans. It amounts to a restatement of item "e" reflecting the appropriate regulatory citation.)

According to the above described procedure, an individual attends a 15 hour housing counseling course, preferably conducted by a HUD-sponsored non-profit organization, before he or she becomes qualified as an SRP. It should be noted, however, that the number of counseling hours required might vary depending on whether the buyer has attended the course before, or based on modifications to the requirements established by HUD or other government agency or department. After counseling is completed, the buyer signs a self-representation agreement with a real estate brokerage office having access to a system for tracking, monitoring, and supporting self-representation activities (hereinafter referred to as the system), and completes orientation in the use of the brokerage office's services.

Once the SRP completes his or her orientation and is enrolled in the system, the SRP can receive information of property listings that match the SRP's search criteria. According to a currently preferred embodiment, the system downloads property listing information from a Multiple Listing Service (MLS) operated by a local group of real estate professionals. A local MLS provides information to its members of properties listed for sale in the local area. Because the SRP is a client of a member brokerage office for the purpose of purchasing a real estate property, such access to property listing information does not violate MLS rules which currently prohibit access to non-members. Instead, the SRP format involves an MLS member-broker re-distributing compiled and filtered listing information to its contracted homebuyer clients for purposes of obtaining a buyer for the property. This practice is consistent with the stated purpose of a multiple listing service and the techniques employed are compliant with the current NAR model rules and regulations.

When a new property listing matching the SRP's profile is detected, the system alerts the SRP of such listing, and further provides profile information of the matched property. Upon receipt of such notice and/or profile information, the SRP might request sales information of comparable homes in the area, school district reports, environmental hazard reports, automated offer drafting assistance, demographic information, and other assistance and information for aiding the SRP's self-representation activities.

The system tracks the SRP's self-representation activities and generates an activity tracking report for inclusion in the SRP's loan file. The report might then be used to certify that the SRP has indeed represented himself, and thus, is entitled to the real estate commission. The SRP can then apply the commission towards the downpayment of a home.

Considering the foregoing summary of the features of the system and method of the present invention, FIG. 1 depicts a simplified, semi-schematic block diagram of an exemplary tracking, monitoring, and support system in accordance with the present invention. The system comprises at least one network server or a platform computer 10 in communication with an MLS system 12 via a communications link 14. Network connection via the communications link 14 may be performed by a number of well known methods including LAN connection, WAN connection, RS-232 connection, R/F communication, and the like.

The network server or platform computer 10 periodically downloads property listings data from the MLS system 12 into a local MLS database. The MLS database resides in a local mass storage device 16 taking the form of a hard disk drive or drive array. The downloaded data includes profile information relating to the property's price, location, bedroom and bathroom count, square footage, number of stories, and the like. Alternatively, instead of downloading property listings data from the MLS system, the data is entered directly into the system by a brokerage employee 20.

The mass storage device 16 further hosts a client/SRP database and a property listings database. The client/SRP database comprises a series of records of SRPs who have met the necessary requirements for self-representation and are enrolled in the system. An SRP record is headed and identified by a client name or a client ID. Following the client name or ID, the data record includes a client profile entry comprising property profile search fields (search parameters). Exemplary search parameters include price, location, bedroom and bathroom count, square footage, number of stories, and the like. The record also includes the client's physical address, e-mail address, pager number, facsimile number, and/or telephone number, for notifying and providing property profile information and related reports of a property matching the client's search parameters. The record, moreover, includes fields for storing the client's passcodes for Internet and touch tone access.

In addition to the foregoing, each SRP record includes the SRP's financing qualifications such as monthly income, current rent, first-time homebuyer status, number of persons in the household, and the like, for automatically determining whether the SRP is qualified for city, county or other forms of down payment or monthly payment assistance. A system status field indicates the status of each SRP as being active, inactive, in negotiations, having a transaction pending, or having a transaction closed.

The mass storage device 16 also hosts an activity tracking database comprising a tracking record for each SRP enrolled in the system. Each tracking record is headed and identified by a client name or a client ID. Following the client name or ID, the tracking record includes an information area for maintaining a log of the SRP's self representation activities. The information area may be arranged in a variety of ways, but is most advantageously configured as sequential entries, with each entry specific to an activity being tracked. An activity entry might include the date in which the activity took place. An activity entry might further include text describing the nature of the activity. In a preferred embodiment, the activities tracked relate to home counseling course attendance, property availability notification, interior inspection, offers and counter-offers, physical inspection, termite inspection and clearance, corrective work, interest rate lock, title and escrow company and home warranty provider selection, walk-through, comparable sales requests, appraisal disclosure, seller's escrow credit, title vesting selection, pre-closing statement disclosure and acceptance, preliminary title report acceptance, and homeowner's association documents. It should be apparent to those skilled in the art that other activities might also be tracked to conform to the rules established by HUD or any other governmental agency.

After the SRP has taken the steps to formalize the purchase of a property, the system retrieves the SRP's tracking record from the activity tracking database, and generates an activity tracking report. FIGS. 2A–2B are illustrations of one such report. The report is included into the SRP's loan file, and used to evidence that the SRP has performed the typical duties of a licensed agent, entitling the SRP to a real estate commission pursuant to the commission agreement with their MLS member-brokerage office.

The property listings database, also hosted by the mass storage device 16, comprises a series of records of property listings downloaded from the MLS system 12 as edited by the brokerage employee 20. In a currently preferred embodiment, property listings from the MLS system are first downloaded to the local MLS database in the mass storage device 16 on a periodic basis (e.g. every 15 minutes). The brokerage employee 20 then strips any confidential information from the downloaded property listing, and stores it into the property listing database. Such confidential information might range from alarm and lock box codes to comments about a seller's health condition. By stripping the confidential information, the seller's privacy is protected without compromising the SRP's ability to evaluate the property. Thus, only statements concerning the property's features and relevant terms and conditions of sale, are disclosed. Additional remarks relating to the property might also be entered by the brokerage employee 20 in a comments section of the downloaded listing. The brokerage employee 20 might further enter proprietary listings not originated from the MLS system 12, into the listings database.

All edited proprietary property profile information is stored as a record in the property listings database. Each property record is headed and identified by a property ID which, in a preferred embodiment, is the ID assigned by the MLS system 12. Alternatively, the system might provide its own property ID in addition or in lieu of the MLS ID.

Furthermore, the system also maintains videographic image data of available properties, generally in the form of photographs, in a property photo database. The image data might be obtained by a field agent visiting a property and taking a picture of the property with a digital camera or any other device capable of outputting a digital image. The videographic image might comprise either gray scale or color video data. Preferably, the videographic image data will be in color to adequately represent the property's appearance. This data is associated with its property ID and then stored in the property photo database.

In a currently preferred embodiment, the brokerage employee 20 also makes a narrative recording of the property's features and stores the recording as a digital sound file in a narration database. As in the property photo database, each recording file in the narration database is identified by its property ID.

The system notifies the SRP of a property matching the user's search parameters via one or more communication methods elected by the user. In doing so, the system searches the SRP's record for a pager number, telephone number, e-mail address, facsimile number, or any other type of contact information. If a pager number exists, the system, either automatically or via the brokerage employee 20 making use of a telephone 22, issues a page alert to the SRP's pager 24. The system also sends notifications to the SRP's cellular phone 26, telephone 28, fax machine 30, and/or e-mail address if such methods of notification were elected by the SRP.

The alert might be as simple as a statement that a matched property was found, and provide the matched property's ID. Alternatively, the alert might actually provide profile information of the matched property.

In the first instance where the profile information is not provided with the alert, the SRP receives such information in later communications with the system. For instance, a property disclosure form might be faxed, mailed, and/or delivered by courier to the SRP. Alternatively, the SRP might use the telephone 28 or cellular phone 26 to access the system's touch tone service and retrieve a recorded narration of the matched property's profile. According to one embodiment, the recorded information is accessible only upon input of a valid password. Alternatively, the recording is automatically transmitted to the SRP's telephone 28 or cellular phone 26 after the information becomes available.

In yet another method of retrieving property information, the SRP accesses the system's Web page through an Internet connection 32. The Internet connection might comprise ISDN lines, ADS lines, DBL lines, and the like. A personal computer 34 equipped with a modem (not shown) might be used to access the Internet connection 32. Alternatively, a television system 36 equipped with a digital or analog set top box with Internet capabilities is used to connect to the Internet. Once logged onto the system, the SRP enters his or her client ID and password on the system's Web page. If the entries are valid, the system provides access to property profile information for display on a display monitor. The information might then be stored in the user's PC 34 or television system 36, or printed on the user's printer.

The SRP reviews profile data of a matched property and decides if it suits his or her interests. If so, the SRP might perform a drive-by exterior inspection to familiarize himself or herself with the neighborhood and the property's setting. If, after this procedure, the SRP desires to perform an inspection of the property itself, the SRP calls the viewing desk at the brokerage office to arrange an appointment for a viewing of the property.

The SRP may designate the viewing as exclusive or open. Exclusive viewings are private. Open viewings allow the system to notify other buyers whose search parameters also match the property's features, of the date and time of the showing. The showing notification is sent out to the other buyers via the communication methods described above for property availability notices. Any subsequent SRPs attempting to "piggyback" the showing can register their attendance with the system to keep the appointment open in the event the original SRP cancels. If the original SRP cannot make the appointment, and no other SRP's have registered their attendance, the system proceeds to cancel the viewing.

After the SRP has inspected the property, he or she can request additional information on the property, its neighborhood and schools. The SRP can also retrieve sales of comparable homes to determine the value of the property, and hence, the price the SRP might wish to offer. Offer composition tools available through the system allow the SRP to prepare a Request to Draft Offer form for submission to the brokerage office. The offer composition tools may be any suitable commercial tool or software, such as Altaira™ available from Geac Computer Corporation, LTD. The tools consist of closing cost estimating routines that allow the SRP to consider the effects of different interest rate and loan discount point options. By selecting higher or lower interest rates in the software utility, the closing costs may be re-calculated to inform the SRP of the accurate amount he or she may need to request for seller paid costs. Since FHA loans specifically allow a seller to pay up to six percent of the sales price toward the buyer's closing costs, this feature assists buyers in minimizing the amount of cash they will need to close escrow.

Once the SRP completes the Request to Draft Offer form, he or she presents it to the brokerage manager at the brokerage office. The manager assists the buyer by drafting the offer in a format acceptable to the marketplace and obtains the SRP's signature approving the offer. The brokerage office then transmits the offer to the MLS listing office.

With the aid of commercially available tools such as Altaira™, the system is able to track the offer and any acceptance or counter-offers, and provide a status report to the SRP upon request. The SRP, therefore, can reliably stay up-to-date on the progress of the transaction until a closing stage.

Figure 3:
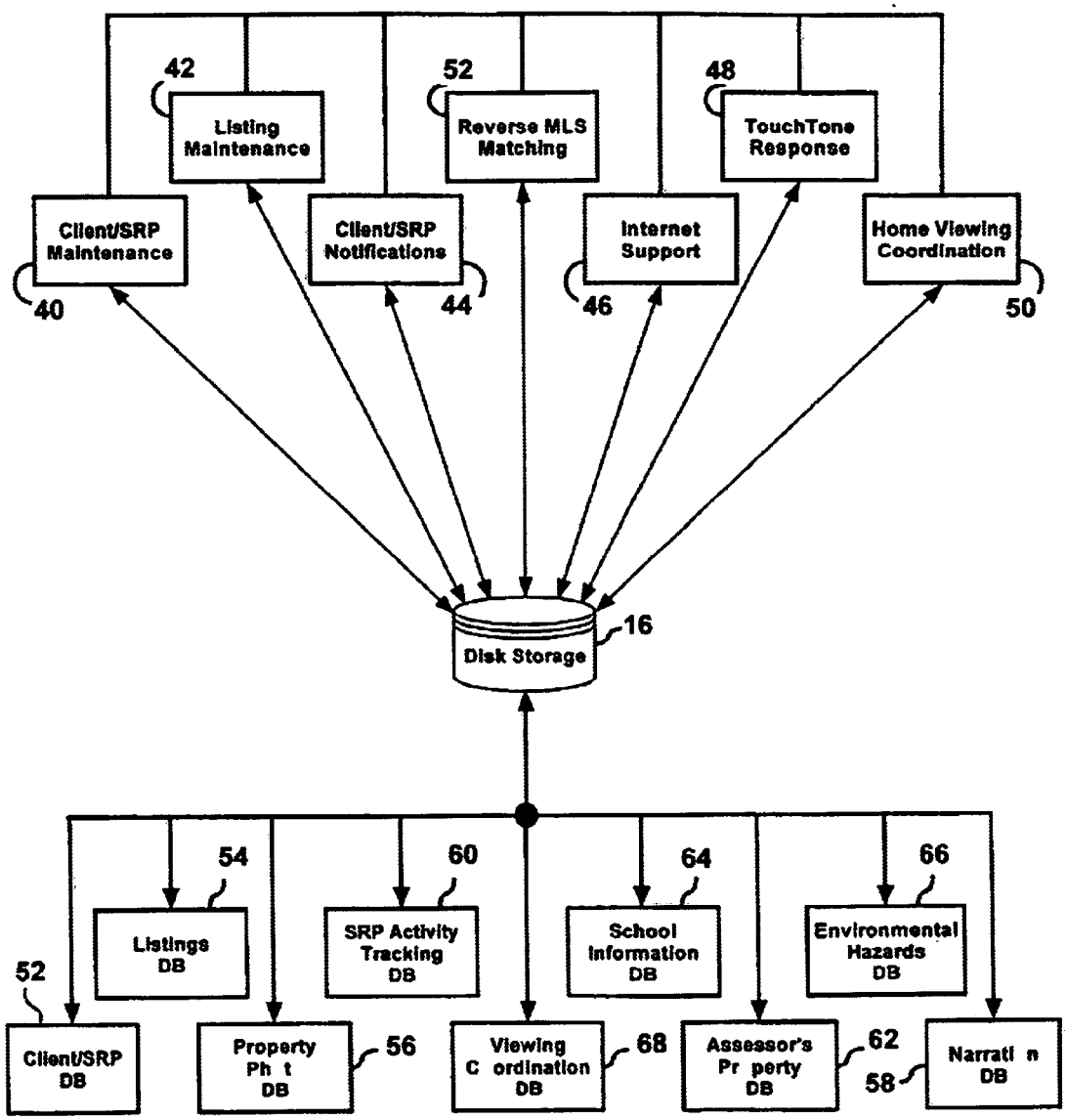
FIG. 3 is an exemplary semi-schematic block diagram of system modules and database structures of the system of FIG. 1.

FIG. 3 is a block diagram of the modules and databases for aiding the SRP in his or her self-representation activities. The modules might reside operationally on a single network server or platform computer 10. Alternatively, the modules might reside on a local area network or wide area network.

Figure 4:
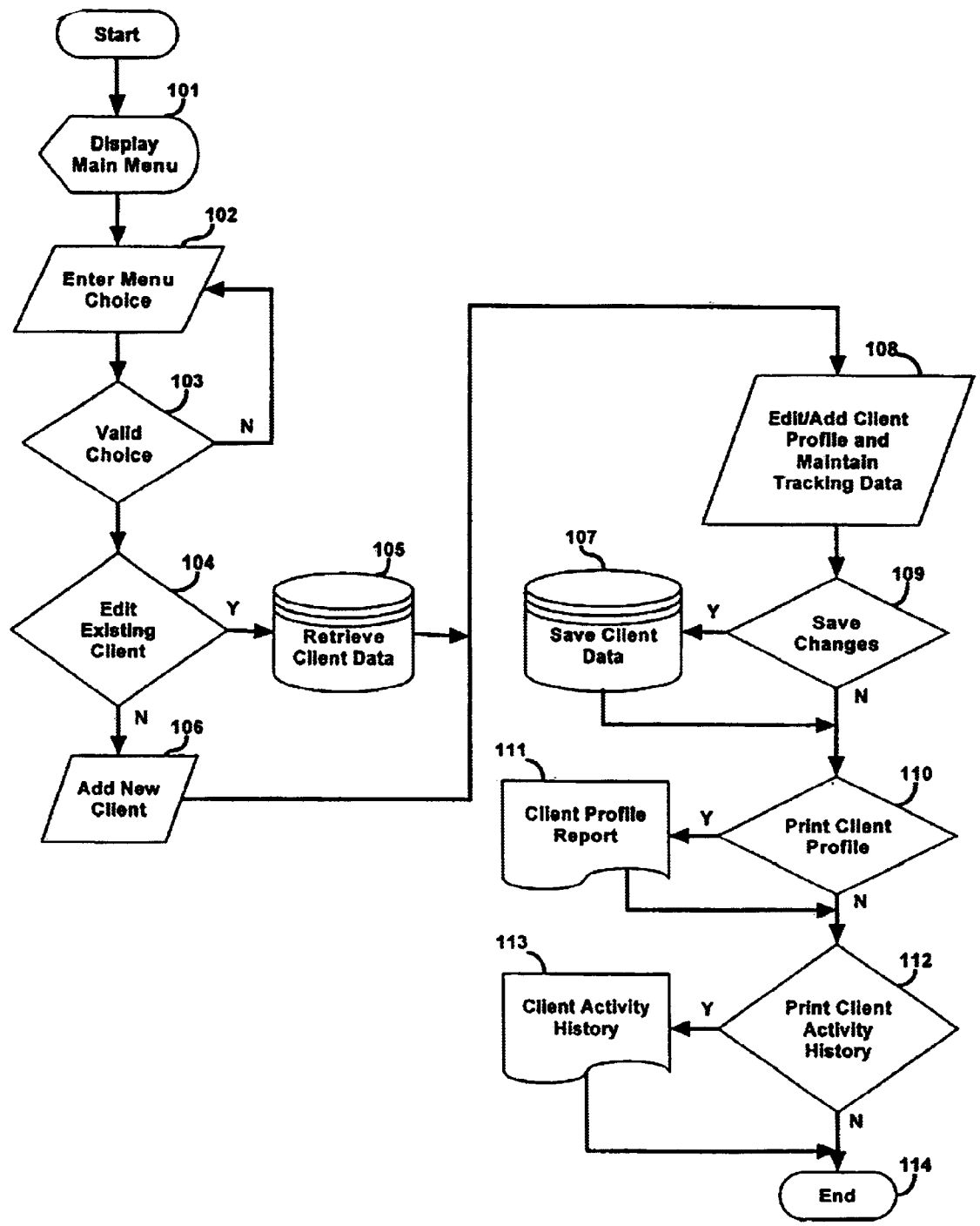
FIG. 4 is an exemplary process flow diagram of a client/SRP maintenance module of FIG. 3.

A Client/SRP Maintenance Module 40 allows the brokerage employee 20 (FIG. 1) to make additions and edits to client records in a client database 52. FIG. 4 is an exemplary process flow diagram, described in terms of a computer program routine, of the Client/SRP Maintenance Module. The process begins by displaying a selection screen in step 101. The selection screen comprises a listing of client records in the client database 52, along with menu choices allowing addition and edits of a client record and the SRP's tracking record. As a menu choice is detected in step 102, the process inquires in step 103 whether the selection is valid. If the selection is invalid, the process reverts to step 102 for another menu selection.

If the selection is valid, the process continues to inquire in step 104 whether the employee selected an existing client record. An affirmative answer causes the process, in step 105, to retrieve the corresponding client record from the client database 52, and the SRP's tracking record from an activity tracking database 60. The process displays the retrieved information in step 108. The SRP brokerage employee 20 may then edit the information as desired.

Referring back to block 104, if the existing client data is not to be edited, the process creates a new client record and an SRP tracking record in step 106, and adds appropriate profile and tracking information in the records in step 108.

In step 109, the process inquires whether the client record is to be saved. If the answer is YES, the process in step 107 stores the edited or new client record in the client database 52. The process also inquires in step 110 whether to print the client's profile data. If the answer is YES, the process in step 111 prints a client report containing the client's profile information.

The process also determines in step 112 if an SRP activity history report is to be printed. If this is true, the process accesses the activity tracking database 60 (FIG. 3) and generates such a report in step 113. In a currently preferred embodiment, the report includes data such as: the dates of enrollment and completion of the home counseling program; the date the SRP signed the self-representation agreement with a broker; the date the buyer received SRP orientation from their broker; the dates and addresses of the property notifications received by them; the dates and addresses of homes that were physically viewed; any previous offers that were attempted but failed; the date the successful offer was issued; the date the SRP attended the physical inspection; and the date the SRP attended the pre-closing walk-through inspection. This report evidences that the SRP has indeed performed activities of a licensed real estate agent, and allows the SRP to use the earned commission towards the downpayment of a property.

Figure 5:
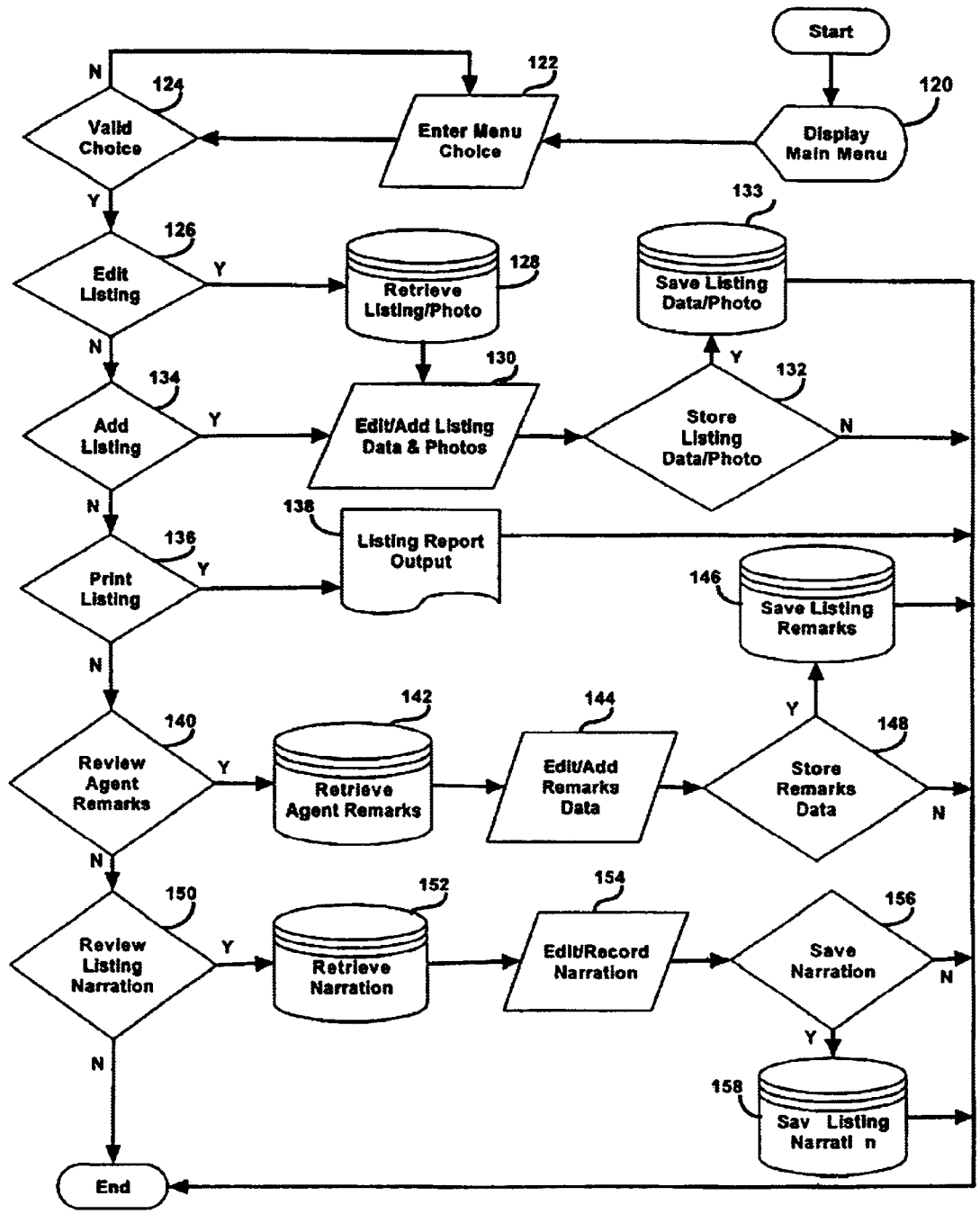
FIG. 5 is an exemplary process flow diagram of a property listing maintenance module of FIG. 3.

Referring back to FIG. 3, a Listings Maintenance module 42 allows the editing and storing of property listings downloaded from the MLS system 12 (FIG. 1), or input directly into a property listings database 54. FIG. 5 is an exemplary process flow diagram of the Listings Maintenance module 42. The process begins by displaying a selection screen in step 120. The selection screen comprises a listing of property records in the property listings database 54, along with menu choices allowing addition and edits of a property record. As a menu choice is detected in step 122, the process inquires whether the selection is valid in step 124. If the selection is invalid, the process reverts to step 122 for another menu selection.

If the selection is valid, the process determines in step 126 whether an existing property record was chosen for editing. If so, the process continues to step 128 where the listing and corresponding photo is retrieved from the property listing database 54 and the property photo database 56, respectively. The process, in step 130, enters the new property data or photo into the system. If the data or photo is to be stored, as inquired in step 132, the process, in step 133, stores the data or photo into the respective databases.

Referring back to step 126, if the brokerage employee did not select to edit a property listing, the process inquires in step 134 if a new property record is to be added. An affirmative answer causes the process to create a new property record and add data or photo of the property as described in step 130.

If the brokerage employee selected a print listings option, as depicted by the YES branch to step 136, the process in step 138 prints a property report containing the property's profile information.

Referring again to step 136, if the employee did not opt to print a listing, the process determines in step 140 whether the employee selected a remark editing option. If so, the system continues to step 142 where an MLS listing is retrieved from the MLS database and edited in step 144. The employee might also add additional comments in a comments section of the listing. The process in step 146 stores the new or edited remarks in the property listings database 54 (FIG. 3), if such a selection is detected in step 148.

Referring back to step 140, a NO answer to the inquiry as to whether a review agent remarks was made causes the process to continue to step 150 where it inquires whether the employee has opted to create or re-record a listing information narration. If so, the process continues to step 152 where the process retrieves the corresponding audio file, if it exists, from a narration database 58 (FIG. 3). The employee may then hear, edit, and/or re-record the narration in step 154. In step 156, the process inquires if the narration is to be saved. If it is, the process stores the narration as a digital audio file in the narration database 58 in step 158.

Referring again to FIG. 3, a Client/SRP Notifications module 44 provides up-to-date information of property listings matching the SRP's search parameters. In this way, the SRP is not at an information disadvantage to licensed agents practicing in the industry, as it enables the SRP to become aware of new listings within a short time of their being placed in the MLS system 12.

Figure 6:
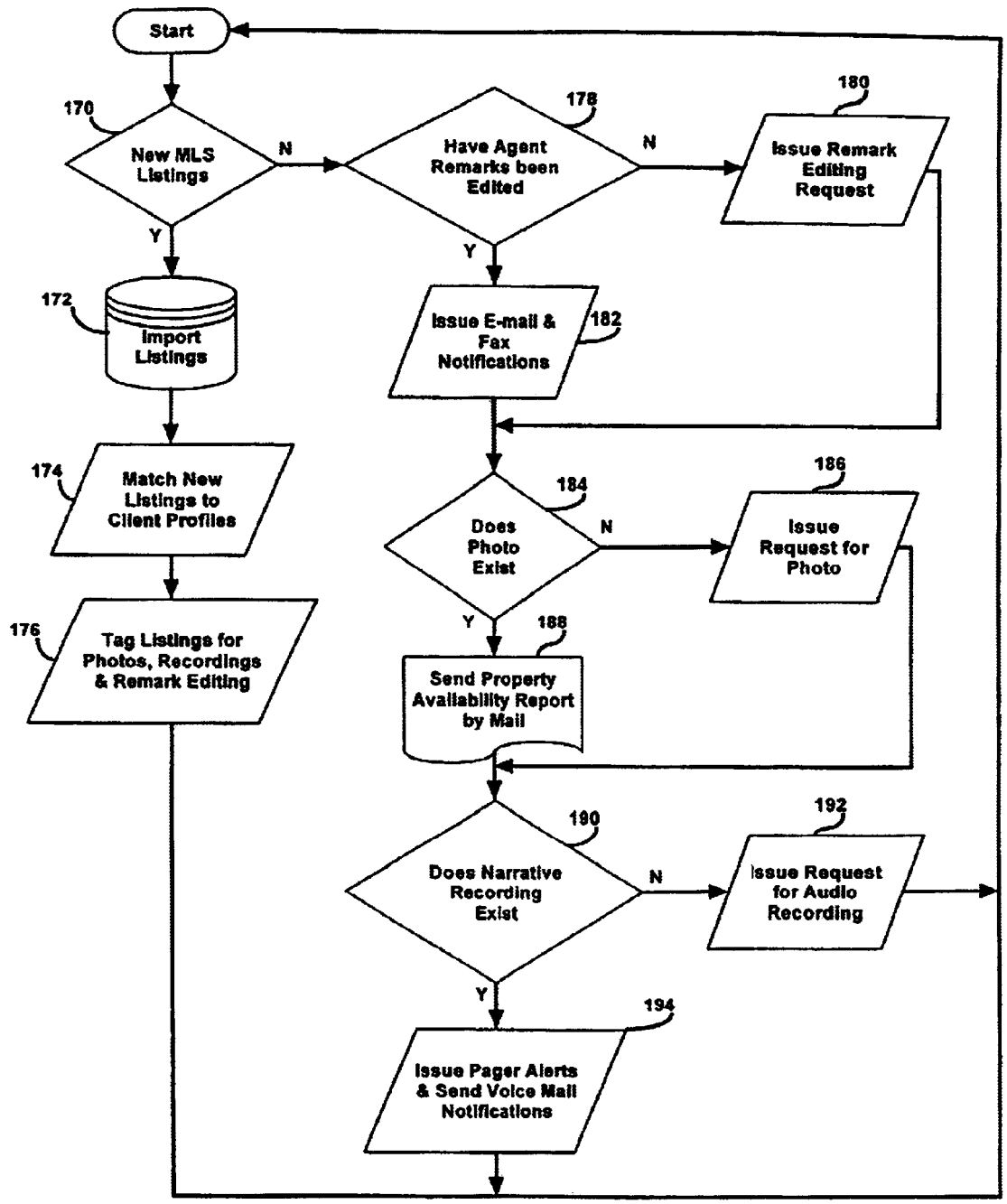
FIG. 6 is an exemplary process flow diagram of a client notification module of FIG. 3.

FIG. 6 is an exemplary process flow diagram of the Client/SRP Notifications module 44. According to a currently preferred embodiment, the module cycles in a "watchdog" fashion waiting for a new listing from the MLS system 12 (FIG. 1). Accordingly, the process inquires in step 170 whether such a new listing exists. If so, the process in step 172 downloads the new listing from the MLS system. In step 174, the process compares the new listing with client profiles in the client database 52 (FIG. 3). The process flags the matched listings in step 176 for sending notifications to the matched SRPs. The process further associates a narrative recording flag, photo flag and agent remark editing flag in step 176, for operator intervention.

Referring back to step 170, if the process has downloaded all the new listings from the MLS system, as reflected by the NO branch to step 170, the process determines in step 178 if the new listings have been edited. This might be accomplished by polling the remark editing flag associated with the listing. If the remark editing flag has not been set, edits are required. In this case, the process transmits in step 180 a remark editing request to the brokerage employee 20 (FIG. 1). The request might take the form of telephonic pages and/or internal system alerts according to well known principles. The requests are periodically transmitted until the brokerage employee retrieves the listing from the MLS database, edits any confidential information, and stores the edited property information into the listings database 54. In a preferred embodiment, alerts are transmitted every fifteen minutes. Those skilled in the art would recognize, however, that longer or shorter time intervals may be used for sending the alerts. Once a property listing has been edited, the process sets the remark editing flag to TRUE.

In step 182, the process issues notifications of a matched property listing if the confidential information has been edited. In doing so, the process retrieves contact information (e.g. an e-mail address or a fax number) from the record of a matched SRP. The process then notifies the SRP of the new listing. If the SRP has elected to be notified via e-mail or fax, the actual profile information of the matched property is also transmitted to such e-mail address or fax number.

The process also inquires in step 184 whether the new listings have corresponding photographs in the property photo database 56 (FIG. 3). This might be accomplished by polling the photo flag associated with each new listing. If the photo flag for a listing has not been set, the listing does not have a corresponding photograph. In this case, the process transmits a request for a photo in step 186. An agent out in the field receives the photo request and proceeds to take a digital photograph of the property. The agent delivers the photograph to the brokerage employee 20 for input to the photo database 56. The process then sets the photo flag associated with the property, to TRUE.

If a photograph of the new listing exists in the photo database 56, the process arranges the photograph and the edited property profile information as a property availability report, and transmits the report to matched SRPs in step 188. FIG. 7 is an example of one such report.

In step 190, the process inquires whether the new listings have corresponding audio files in the narration database 58 (FIG. 3). This might be accomplished by polling the narrative recording flag associated with each new listing. If the narrative recording flag for a new listing has not been set, the listing does not have a corresponding audio file. In this case, the process, in step 192, transmits a request for such audio recording to the brokerage employee 20.

Upon receipt of such request, the brokerage employee 20 creates an audio file of the property and stores it into the narration database 58. The process then sets the narrative recording flag to TRUE.

If an audio file for a new property exists in the narration database 58, the process, in step 194, transmits pager and voice mail notifications containing a narrative of the property's profile to the matched SRPs. Alternatively, upon receiving notification from the system, an SRP might access the system's touch tone service via a telephone to retrieve the narration. This method of retrieval is discussed below in greater detail.

Referring back to FIG. 3, an Internet Support module 46 provides Internet accessibility to the SRP. Communication with the SRP via the Internet is currently preferred due to its speed and relatively inexpensive operation costs. An SRP accesses the system via the Internet connection 32 (FIG. 1) through the SRP's PC 34 or television system 36.

Figure 8:
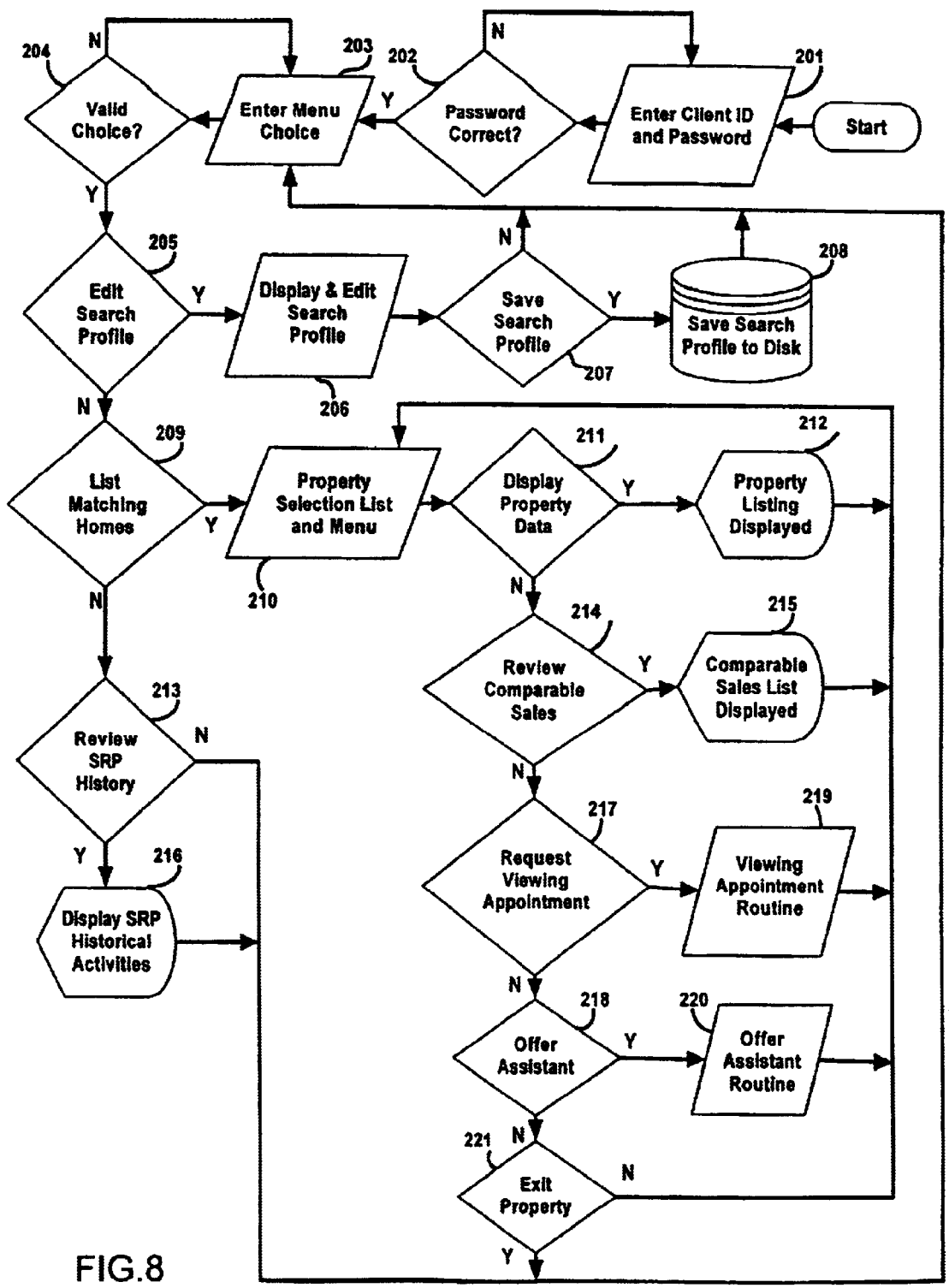
FIG. 8 is an exemplary process flow diagram of an Internet support module of FIG. 3.

FIG. 8 is an exemplary process flow diagram of the Internet Support module. The process starts and continues to step 201 where the client ID and password are requested for logging the SRP onto the system. The process authenticates the password in step 202. If the ID or password is incorrect, the process reverts to step 201 for re-entry.

If the input is validated, the process continues to step 203 where a main selection menu is presented. The process continues to step 204 where a user menu selection is validated. If validation of the selection fails, the process returns to step 203 for re-entry of the selection. If a valid selection was made, the process continues to step 205 where it inquires whether the SRP selected an option to modify his or her property search criteria. If this is the case, the process continues to step 206 where it accesses the client/SRP database 52 (FIG. 3) and retrieves the SRP's search parameters from the SRP's record. The process displays the search parameters for user edits.

Upon completion of viewing or editing of the SRP's his or her search parameters, the process continues to step 207 where the SRP may elect to save the new search profile. If the SRP responds to step 207 by electing to save the new search profile, the process continues to step 208 where the updated SRP record with the new search profile is stored in the client/SRP database 52. In addition, the time and date that the SRP modified the search profile as well as the content of the search parameter modification is written into the SRP's tracking record in the activity tracking database 60. This allows generation of tracking documentation for the SRP's loan file according to the currently established HUD procedures.

Referring back to step 205, if the process determines that the user did not select the option to edit the search profile, the process continues to step 209 where it determines if the user requested a listing of the available homes matching his or her search profile. If the answer is YES, the process continues to step 210 where the process retrieves a listing of the matched properties from the property listings database 54. The process continues to display the listings to the SRP along with a sub-menu of options available for the displayed listings.

The process thus inquires in step 211 if the user requested a comprehensive property data display for a particular listing. If so, the process continues to step 212 where it searches the listings database 54 and the photo database 56 for data corresponding to the selected listing. The process retrieves property profile data from the listings database 54 and the property's photograph from the photo database 56, and bundles the profile data and photo into a report format. The process then displays the report to the SRP.

According to a preferred embodiment, the process further displays school district information and environmental hazards information retrieved from a school information database 64 and environmental hazards database 66, respectively. The school district information might include photos of the schools in the area, rankings, student-to-teacher ratios, and the like. The environmental hazards information might include information as to waste dumps, chemical factories, and the like, in the area where the property is located. A person skilled in the art should recognize, however, that additional types of information relating to the property and its district can also be displayed to the user. For instance, a link to the local sex offenders database would allow display of a list of any convicted sex offenders in the area. The process also records the SRP's selection to view property data in his or her tracking record to document that the user reviewed the subject property.

Referring again to step 214, if the user did not select to display property data, the process determines in step 214 if the user chose to review comparable sales information. If the answer is YES, the process displays comparable sales information in step 215 for user consideration. Comparable sales information includes photos and data of property similar to the matched property in size, location, amenities, and the like. The SRP might use this information in determining the potential market value of the matched property. The process records the SRP's selection to view comparable sales information in his or her tracking record to reflect that the SRP considered the comparable sales information in evaluating the property.

Figure 10A:
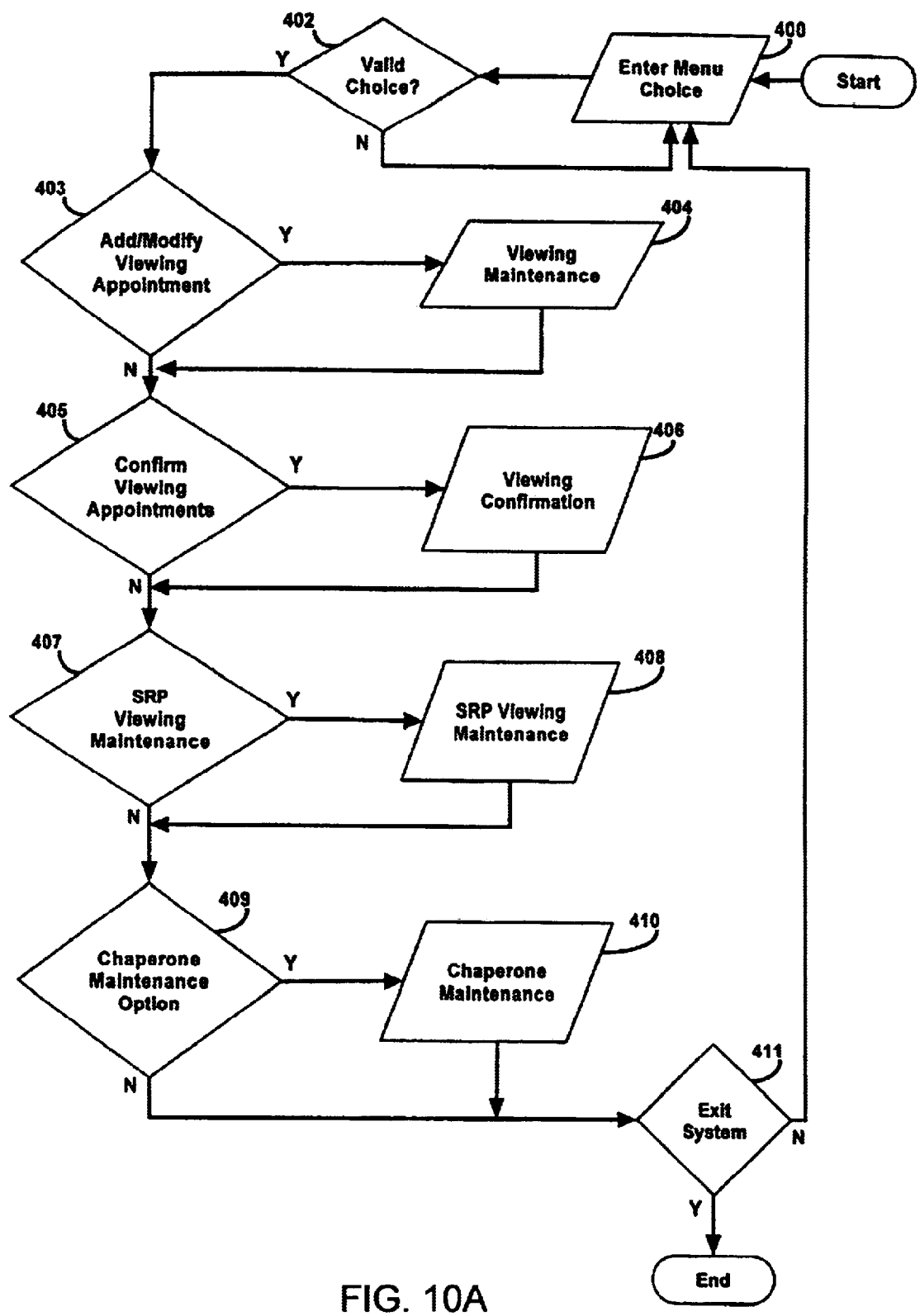
FIGS. 10A–10B are exemplary process flow diagrams of a Home Viewing Coordination module of FIG. 3.
Figure 10B:
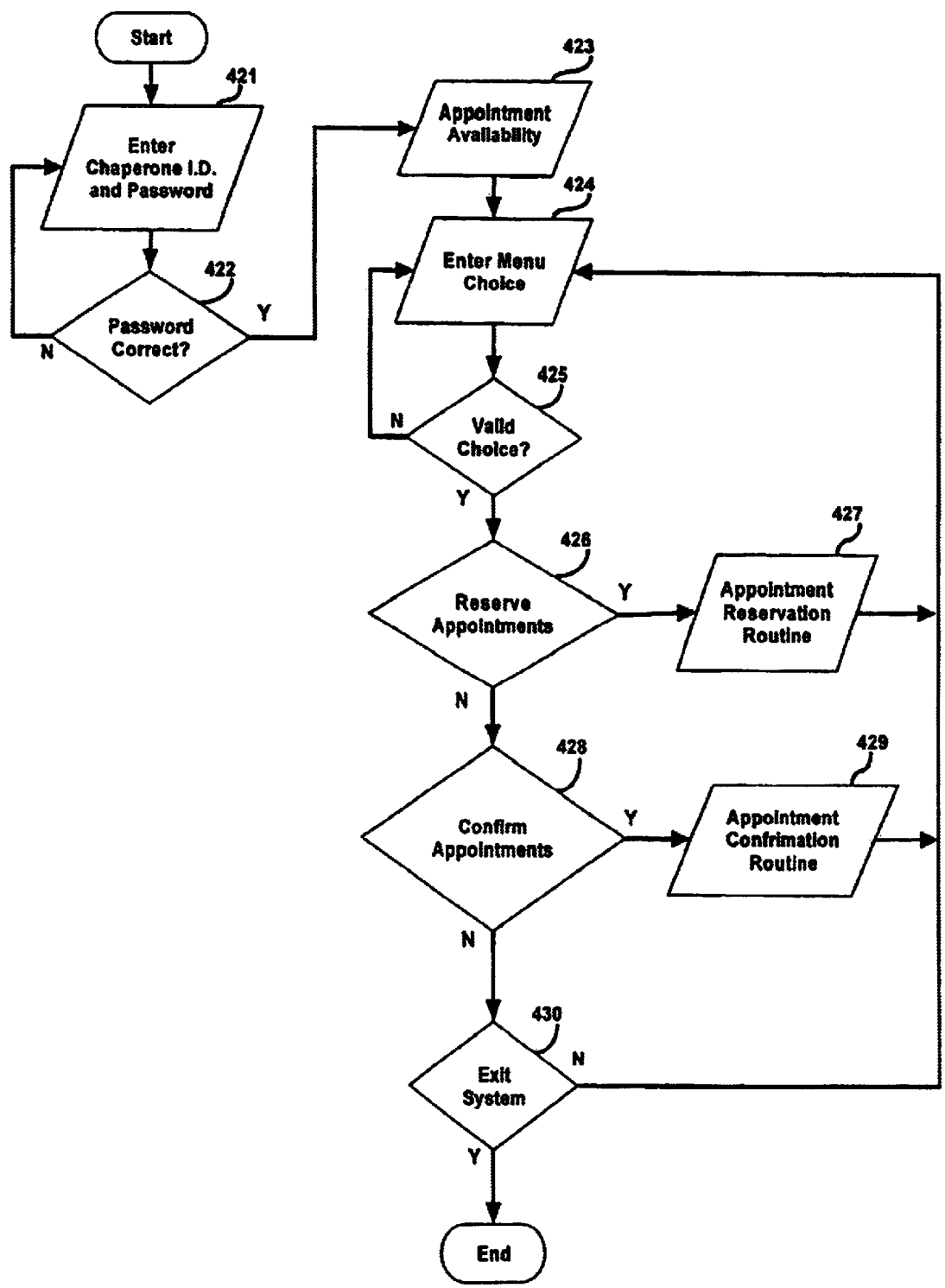

If the SRP did not select the option to review comparable sales information the process inquires in step 217 if a viewing appointment option was selected. If this is true, the process continues to step 219 where the process invokes a viewing appointment sub-routine. The sub-routine, discussed in further detail below in conjunction with FIGS. 10A–10B, presents a calendar to the user to indicate the status of viewing opportunities for the matched property. The user may request a viewing appointment for a certain time and day. The process records the SRP's selection to view appointments in his or her tracking record.

At step 218, the process determines if the user selected an offer assistance option at step 210. If this is the case, the process continues to step 220 where an offer assistant sub-routine is invoked. The sub-routine provides current interest rates on the loan for which the SRP has been pre-approved, and further allows the SRP to create theoretical offer scenarios to accurately estimate their monthly payment and cash down payment for the selected property. The sub-routine incorporates taxation computations as well as miscellaneous dues in estimating the total monthly payment the SRP would make in the event the theoretical offer was accepted. The sub-routine further provides an estimated escrow closing date and closing costs. The SRP's actions upon invoking the offer assistant sub-routine are also entered into the SRP's tracking record.

If the process determines in step 221 that the user has selected to exit matched property selection list and associate sub-menu, the process returns to step 203 where a main menu choice is expected.

Referring back to step 209, if the user did not select to list matching homes, the process inquires whether the user has selected to view his or her tracking history. If the answer is YES, the SRP's history of HUD class training dates, SRP orientation, any self-representation activities, and all other tracked activities is displayed in step 216. The tracking history might thus be used to certify the SRP's execution of his or her functional duties, allowing the SRP to claim that he or she has earned a real estate commission for use toward a minimum cash investment requirement for a particular property.

Referring back to FIG. 3, a Touchtone Response module 48 allows the SRP to obtain disclosures of matched properties by calling the system via his or her telephone or cellular phone, and accessing the system's touch tone services. All SRP activity while being connected to the system is recorded in the SRP's tracking record.

Figure 9:
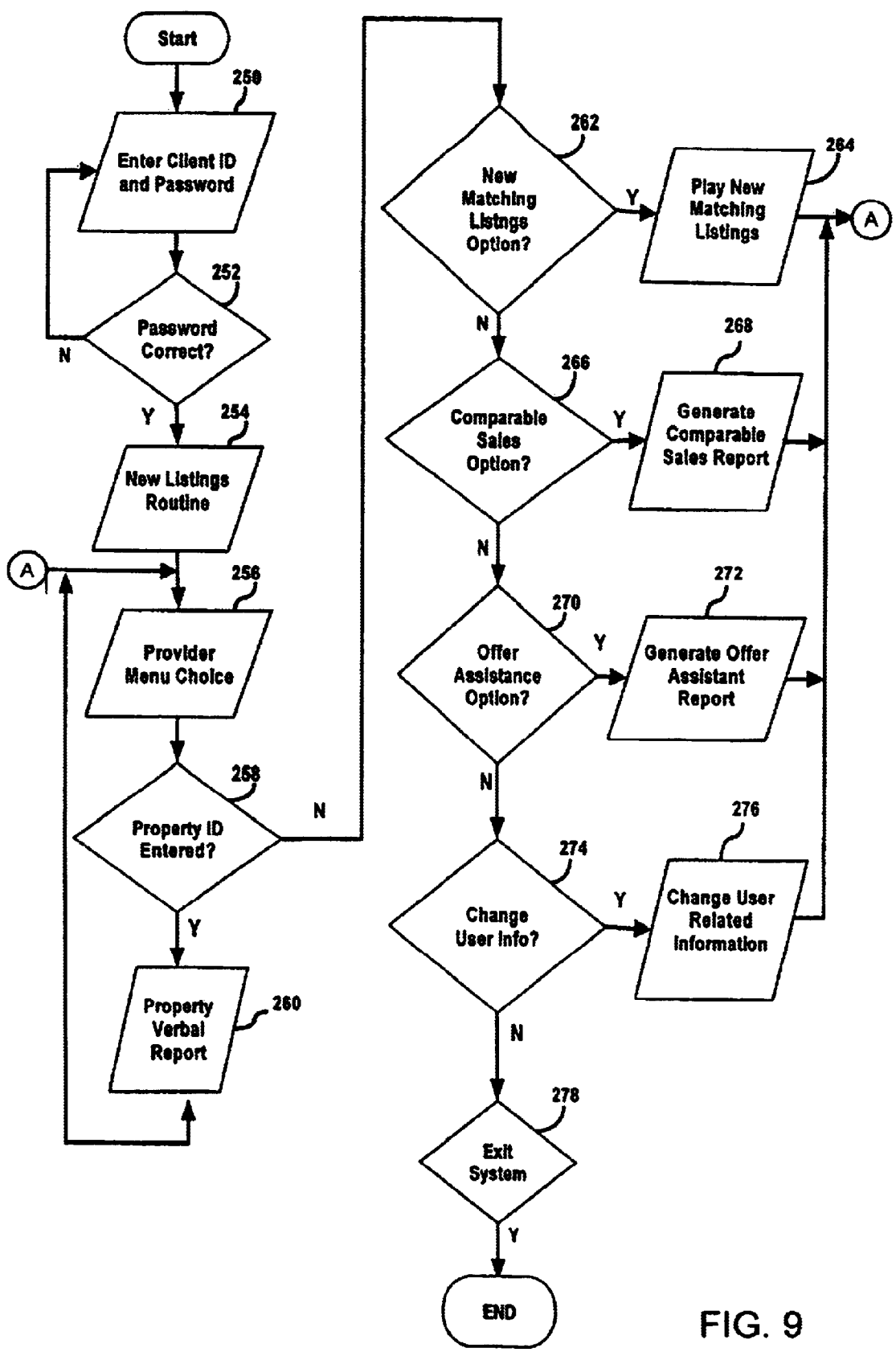
FIG. 9 is an exemplary process flow diagram of a touch-tone support module of FIG. 3.

FIG. 9 is an exemplary flow diagram of the Touchtone Response module 48. The process starts as it detects an incoming telephonic call on the system's phone line. In step 250, the process requests a client ID and password. The process continues to step 252 where the ID and password are verified. If an incorrect ID or password is provided, the process reverts to step 250 for valid input from the user. Upon such valid input, the process continues to step 254 where it advises the SRP of any new listings matching the SRP's search parameters. According to one embodiment, the system simply plays an audio recording stating the number of such new matched listings. The process then continues to step 256 where an audio recording of a main menu is provided. For instance, the audio recording might state: "Please press 1 to retrieve all new matched listings; press 2 for comparable sales report; press 3 for offer assistance report; press 4 for changing profile information; or enter the property ID number of the property you would like to retrieve"

The user selects a menu item or enters a property ID number via the keypad on his or her telephone. The process then inquires in step 258 if a specific property ID was entered. If the answer is YES, the process plays an audio recording of the status of the property matching the property ID number in step 260. The audio recording might advise the status of the property as active, expired, sold, or pending, and further provide the asking price of the property.

The process next inquires in step 262 if the SRP has opted to review all the new matching listings. If this is the case, the process plays profile information of the new listings in step 264, including the current sales prices, from newest to the oldest. In doing so, the process searches the narration database 58 (FIG. 3) and retrieves audio files of all the new property listings. An exemplary audio recording might state: "At 7:40 am Thursday the property located at 123 Elm Street in Any town—map grid no 693 A2, came on the market at a price of $150,000. This property is described by the listing agent as a 3 bedroom 2 bath single story home offering 1,500 square feet of living space and a fireplace in the family room. The home was built in 1988 and sits on a 7,200 foot lot. The listing agent comments that the home is priced below market and is expected to sell quickly. The escrow term indicated is 30 days or less. Please drive by to see this home and, if interested, call back to arrange an inspection."

If the SRP did not opt to review all the new matching listings, the process continues to step 266 and determines whether the SRP has selected a comparable sales information option from the main menu. Upon an affirmative answer, the process in step 268 generates industry standard reports of comparable sales. Such reports comprise photos and data of property similar to the matched property. The reports are transmitted to the SRP via the Internet, fax, or other known communication methods. The SRP might then use this information in determining the potential market value of the matched property.

Referring back to step 266, if the user has not selected the comparable sales option, the process determines in step 270 whether an offer assistance option was selected. If so, the process continues to step 272 and generates an offer assistance report of a specified property. For example, the report might contain instructions on how to structure closing costs so that the SRP can close escrow with no cash out of pocket. The report might also advise an SRP of the opportunity under a HUD lending guideline allowing the financing of household appliances, such as refrigerators, washers, and driers, into a purchase offer.

An SRP utilizing the SRP's touchtone system might also change his profile information by selecting a change user profile option from the main menu. If such a selection is detected in step 274, the process inquires which profile information the user wants to modify. The SRP might, for instance, have a change of address, telephone number, or property search parameters. The process retrieves the. SRP's client record from the client/SRP database and proceeds to update the record with the newly provided information. The process ends upon detection of selection of an exit option in step 278. Any property report, comparable sales report, or offer assistance report selected by the user is then transmitted to the user via the Internet, fax, or other selected communication methods.

Referring again to FIG. 3, a Home Viewing Coordination module 50 maintains a viewing schedule for the matched properties. FIGS. 10A–10B are exemplary process diagrams of the Home Viewing Coordination module. The process illustrated in FIG. 10A allows a brokerage employee 20 (FIG. 1) to maintain home viewing schedules through the system. The process begins and continues to step 400 where the process waits for a user menu selection. Once a selection is entered, the process continues to step 402 where the selection is validated. If the selection is invalid, the process reverts to step 400 where another selection is expected.

When an SRP makes an appointment to view a home by contacting the brokerage employee 20, the employee selects an add/modify option from the menu provided to enter the SRP's appointment. Thus, the process inquires in step 403 whether such a menu option was chosen. If the answer is YES, the process continues to step 404 where an electronic calendar is displayed with a list of all appointment schedules. The user may filter the displayed appointment schedules by client ID, chaperone name, or property ID. A chaperone is an employee of the brokerage firm that facilitates the showing of the property the SRP desires to view.

The employee enters the appointment time and date indicated by the SRP through the electronic calendar. When the employee has completed entering or editing an appointment, the data is saved into a home viewing coordination database 68 (FIG. 3). Alternatively, if the SRP is connected to the system via the Internet, the SRP may access the add/modify option of the Home Viewing Coordination module and enter the viewing appointment directly, without aid of the brokerage employee.

Upon saving of a new appointment, the system sends an alert to all chaperones available in the area, preferably via pager, to obtain a commitment from one chaperone of his or her availability to do a showing. The first chaperone to call the system and "lock down" (i.e. reserve) the viewing will provide the showing services. The chaperone must then confirm to the system that he or she will be keeping the viewing appointment. Preferably, a chaperone confirms a viewing between 30–45 minutes prior to the viewing appointment time. If the viewing chaperone fails to confirm the appointment prior to 30 minutes before the showing time, the system will issue a page for them to respond. If the response is not forthcoming, the system will alert office personnel so that the showing will not be missed.

A chaperone might make reservations or confirmations of a viewing appointment by accessing the Home Viewing Coordination Module via the Internet. Thus, the process in step 405 inquires whether the user has selected to reserve/confirm a viewing appointment. If the answer is YES, the process marks the appointment as reserved/confirmed.

After a viewing, a chaperone and/or SRP reports back the results of the viewing. If the chaperone has direct access to the system, the results might be entered by the chaperone himself or herself. Otherwise, the results are communicated to the brokerage employee who then enters them into the system. The process thus inquires in step 407 whether the user has selected an SRP viewing maintenance option. If this is so, the process continues to step 408 where the user inputs the results of the viewing of the property. For instance, the user could describe the viewing as resulting in the following: 1) no-show by the chaperone; 2) no-show by the SRP; 3) property unavailable (occupant refusal or other); 4) lock box problems; or 5) successful. The user might also enter a more detailed description, such as a comment that the SRP was not satisfied with the floor plan of the property he or she was viewing. The results are then recorded in the SRP's tracking record.

The Home Viewing Coordination module further allows the brokerage employee to maintain chaperone management information via selection of a chaperone maintenance option. Thus, the process in step 409 inquires if such a selection was made. If the answer is YES, the process continues to step. 410 where information about the chaperones is displayed. Such information might indicate which chaperones are active, and also state the preference of each chaperone for location of the showing appointments. The employee might search for a chaperone, based on the location of a property he or she wishes to view, and edit information concerning the chaperone (e.g. chaperone's contact number). The process then ends if the user then wishes to exit the module in step 411.

FIG. 10B is a process diagram of an alternative method of making reservations/confirmations of appointments by chaperones. According to this embodiment, a chaperone might access the system's touch tone service for reserving or confirming appointments.

The process starts upon detection and answer of a telephone call to the system. In step 421, the process requests a chaperone I.D. and password. The password is confirmed in step 422. If the password or I.D. is incorrect, the process reverts to step 421 where the data is re-entered. Otherwise, the input is confirmed and the process continues to step 423 where the process plays an audio recording of available appointments and outstanding confirmations. The process also plays a recording of a main menu of options in step 424, and awaits user selection of a menu option.

In step 425, the process validates a menu selection. If the selection was incorrect, the process reverts back to step 424 where a new selection is entered. If the chaperone entered a valid selection, the process continues to step 426 where the process determines if the chaperone requested the option to reserve a viewing appointment. If this is true, the process, in step 427, provides an audio recording of a series of appointment opportunities entered by the SRPs, and requests that the chaperone select an appointment he or she wants to secure. The appointment secured by the chaperone will then be unavailable to other chaperones.

If the chaperone did not select to reserve an appointment, the process inquires in step 428 whether the chaperone selected to confirm an appointment. If the answer is YES, the process continues to step 429 where appointments that have been reserved by the chaperone are presented via an audio recording. The chaperone may then confirm that he or she will indeed keep the viewing appointment, or may cancel the appointment, allowing notifications to be sent to other chaperones.

After the chaperone has completed securing or confirming a viewing, he or she exits the system as depicted by the YES branch to step 430.

Referring back to FIG. 3, a Reverse MLS Matching module 52 notifies owners of unlisted homes that their property matches a certain number of SRP profiles, and solicits them to bring their home to market if they are interested in selling. Preferably, only owners of real estate properties who have actively enrolled in the system are selected for notification. The property profiles of such potential sellers are stored in an assessor's property database 62. In an alternative embodiment, notifications are sent to property owners even if they are not enrolled in the system. This type of solicitation is nonetheless passive from the owners' viewpoints as the system notifies the property owners only in the presence of a high demand.

Figure 11:
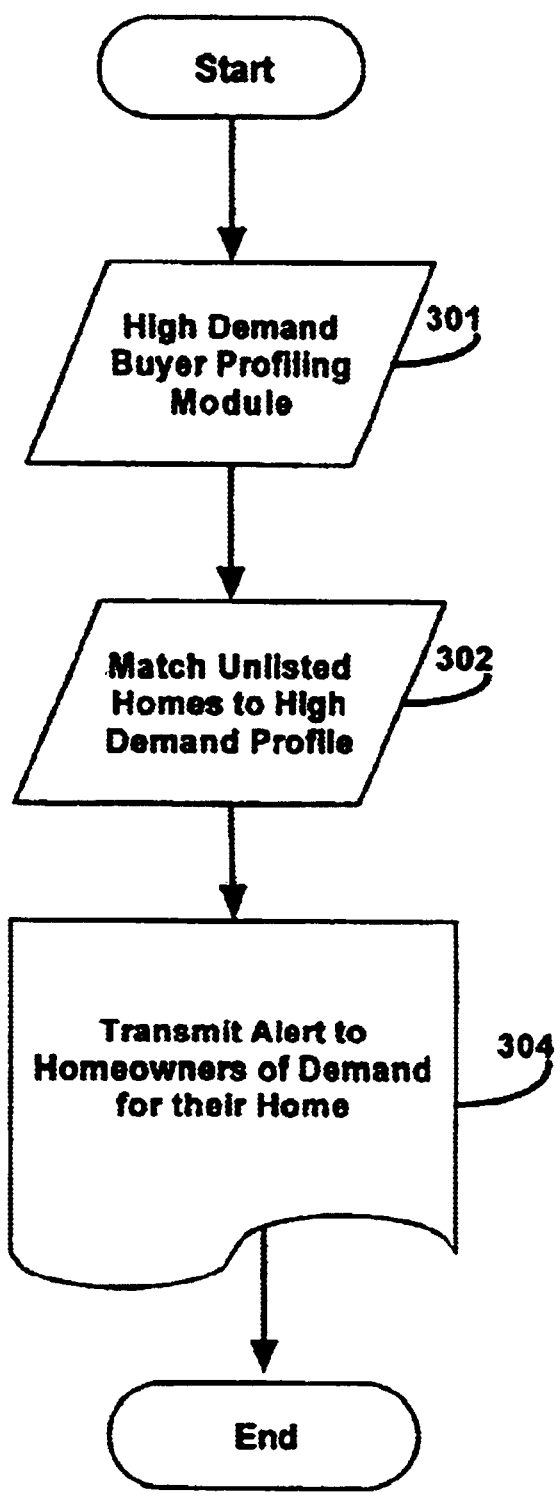
FIG. 11 is an exemplary process flow diagram of a reverse multiple listing service module of FIG. 3.

FIG. 11 is an exemplary process flow diagram of the Reverse MLS Matching module 52. The process begins and, in step 301, a scoring method is utilized to rate the level of demand of particular property profiles by the SRPs enrolled in the system. For instance, if 90 out of 100 SRPs desire a property with a particular number of bedroom and bath counts, square footage, and lot size, a market demand rate of 90 points is given to this particular combination. In one embodiment of the invention, a combination with a market rate of 50 points or above is considered to be in high demand. It should be noted, however, that other values might be utilized to determine what rating constitutes a high demand rating.

In the above example, if most buyers' profiles, however, restrict their search to one story homes and very few buyers monitoring this area are willing to accept a two story home, a combination that would otherwise be considered to be in high demand, when adding a two story feature, would cause the market demand score for the overall combination to significantly decrease. Thus, the higher the score of a particular combination of features, the more readily the market will absorb a property containing those features. On the other hand, the lower the score, the more difficulty there will be in finding an interested buyer for a property containing those features.

Each combination of features with a high market demand rate is designated as a demand feature profile. The process then continues to step 302 where it searches the assessor's property database 62 (FIG. 2) for a property profile matching one of the demand feature profiles. The matched property profile is then tagged for informing the owner of the high demand, and for soliciting the owner to bring the matched property to the market.

In step 304, the process also searches the matched property profile for an e-mail or fax number of the owner who desires to receive notification via e-mail or fax. The matched owners are thus contacted via such means.

The described process of bringing unlisted properties to the market that match the SRP's search parameters, allows the SRP's selection opportunities to be expanded. In addition, the sellers can test the waters to see how many buyers are looking for a property similar to what the seller has, without the dread of a long listing, a lock box on the front door, a for sale sign in the yard, or intrusive phone calls from agents.

Accordingly, there has been brought to the art of computer systems used in the real estate industry, a system and method for tracking, monitoring, and supporting individuals to represent themselves during the purchase of a real estate property. The described system and method connects SRPs to the real estate marketplace. In doing so, SRPs are informed of matched property listings, and given access to property profile information as well as school district information, hazardous waste information, and the like. SRPs may then conduct a viewing, make offers, and ultimately conduct a closing of matched properties. All SRP action is tracked by the system, and a final report of such actions is provided for evidencing that the SRP has indeed represented himself. The present system and method therefore empowers homebuyers to take control of their real estate transactions, and allows them to use earned commissions toward a downpayment of a property.

While the present invention has been described in certain specific embodiments, those skilled in the art will have no difficulty devising variations which in no way depart from the scope and spirit of the invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. A method for tracking, monitoring, and supporting the purchase of a real estate property by a buyer via an electronic information system, the method comprising:

generating a user tracking record for the buyer, the user tracking record storing a list of activities of self-procurement engaged by the buyer in completing the purchase of a real estate property;

storing in the tracking record information about the buyer's attendance in a home counseling program;

downloading real estate property listings from a professional real estate database into a local listings database accessible to the buyer;

authenticating the buyer as an authorized user of the electronic information system;

receiving real estate property search parameters from the buyer;

searching the local listings database for a property matching the search parameters;

notifying the buyer of a matched property;

updating the tracking record with the notification information;

entering a viewing appointment for the matched property;

updating the tracking record with results of the viewing appointment;

invoking a user application module for drafting a purchase offer for the matched property;

updating the tracking record with information on the purchase offer;

storing in the tracking record closing activities engaged by the buyer in completing the purchase of the matched property; and providing verification based on the tracking record that the buyer has engaged in activities of self-procurement performed using this system, which substitute for the services of a licensed real estate professional to earn a real estate commission associated with the matched property for use of the real estate commission as downpayment for purchasing the matched property.

2. The method of claim 1, wherein the step of notifying comprises sending electronic mail to the user.

3. The method of claim 1, wherein the step of notifying comprises sending a pager alert to the user.

4. The method of claim 1, wherein the step of notifying comprises transmitting profile data of the matched property from the listings database.

5. The method of claim 4, wherein the step of notifying comprises establishing a communications link between the electronic information system and an SPP computer, the SPP computer displaying the profile data on a display monitor.

6. The method of claim 4, wherein the step of transmitting the profile data comprises providing an audio recording of the data.

7. The method of claim 1 further comprising receiving a request of a report related to the matched property and updating the tracking record with a log of the request.

8. The method of claim 7, wherein the report is a comparable sales report including sales information of a property in a district where the matched property is located, the property having at least a portion of features of the matched property.

9. The method of claim 7, wherein the report is a school district report of a district where the matched property is located.

10. The method of claim 7, wherein the report is an environmental hazard report of a district where the matched property is located.

11. The method of claim 7, wherein the report is an offer assistance report for the matched property.

12. The method of claim 1 further comprising the steps of:

downloading property profile data from a remote computer;

modifying downloaded profile data; and storing the modified profile data into the listings database.

13. The method of claim 1 further comprising the steps of:

creating a demand feature profile from a plurality of SPP profiles in the client database;

searching an assessor's property database for a property matching the demand feature profile, the assessor's property database comprising profile data of properties that have not been placed for sale; and informing an owner of the matched property of a demand on the property.

14. The method of claim 1 further comprising:

determining whether a new property listing has been included in the professional listings database;

downloading the new property listing from the professional listings database into the local listings database;

determining whether information on the new property listing is to be edited;

editing the information on the new property listing;

determining whether the new property listing matches the real estate property search parameters;

retrieving information on a notification mechanism for the buyer from a user record; and providing notification to the buyer of the new property listing based on the notification mechanism.

* * * * *